United States Patent
Nagabhatla et al.

(10) Patent No.: US 9,598,649 B2
(45) Date of Patent: Mar. 21, 2017

(54) SINGLE STEP CATALYTIC PROCESS FOR THE CONVERSION OF N-PARAFFINS AND NAPHTHA TO DIESEL RANGE HYDROCARBONS

(71) Applicant: COUNCIL OF SCIENTIFIC & INDUSTRIAL RESEARCH, New Delhi (IN)

(72) Inventors: Viswanadham Nagabhatla, Uttarakhand (IN); Sreenivasulu Peta, Uttarakhand (IN); Sandeep Kumar Saxena, Uttarakhand (IN); Rajiv Panwar, Uttarakhand (IN); Devaki Nandan, Uttarakhand (IN); Jagdish Kumar, Uttarakhand (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 73 days.

(21) Appl. No.: 14/441,379

(22) PCT Filed: Nov. 11, 2013

(86) PCT No.: PCT/IN2013/000691
§ 371 (c)(1),
(2) Date: May 7, 2015

(87) PCT Pub. No.: WO2014/073006
PCT Pub. Date: May 15, 2014

(65) Prior Publication Data
US 2015/0284643 A1 Oct. 8, 2015

(30) Foreign Application Priority Data
Nov. 9, 2012 (IN) .......................... 3485/DEL/2012

(51) Int. Cl.
*C10G 35/095* (2006.01)
*C10G 50/00* (2006.01)
(Continued)

(52) U.S. Cl.
CPC ............ *C10G 35/095* (2013.01); *B01J 29/44* (2013.01); *C10G 50/00* (2013.01); *C10L 1/06* (2013.01);
(Continued)

(58) Field of Classification Search
CPC .... C10G 2300/1044; C10G 2300/1081; C10G 2300/70; C10G 35/095; C10G 50/00;
(Continued)

(56) References Cited

U.S. PATENT DOCUMENTS 4,935,566 A 6/1990 Dessau et al.
5,182,012 A 1/1993 Miller et al.
(Continued)

OTHER PUBLICATIONS

Satterfield, C.N. (1980) Heterogeneous Catalysis in Practice, McGraw-Hill, 416 pgs (Office action cites pp. 80-82).*
(Continued)

*Primary Examiner* — Brian McCaig
(74) *Attorney, Agent, or Firm* — John P. White; Cooper & Dunham LLP

(57) ABSTRACT

The present invention discloses a single step catalytic process for the conversion of n-paraffins and naphtha to diesel range hydrocarbons. A bi-metallic Pt—Sn/ZSM-5 catalyst has been developed for the direct conversion of n-heptane as well as naphtha into diesel range hydrocarbons in a single step process.

8 Claims, 1 Drawing Sheet

Reaction time vs diesel yield over the catalyst NTDZSM-5

(51) Int. Cl.
*B01J 29/44* (2006.01)
*C10L 1/06* (2006.01)
*C10L 1/08* (2006.01)
*B01J 37/18* (2006.01)
*B01J 37/00* (2006.01)

(52) U.S. Cl.
CPC .............. *C10L 1/08* (2013.01); *B01J 37/0009* (2013.01); *B01J 37/0036* (2013.01); *B01J 37/18* (2013.01); *B01J 2229/37* (2013.01); *B01J 2229/42* (2013.01); *C10G 2300/104* (2013.01); *C10G 2300/1044* (2013.01); *C10G 2300/1081* (2013.01); *C10G 2300/70* (2013.01); *C10L 2200/0415* (2013.01); *C10L 2200/0423* (2013.01); *C10L 2200/0446* (2013.01); *C10L 2270/023* (2013.01); *C10L 2270/026* (2013.01)

(58) Field of Classification Search
CPC ......... C10L 2270/023; C10L 2270/026; C10L 2200/0423; C10L 2200/0446; C10L 1/06; C10L 1/08; B01J 29/44; B01J 2229/37; B01J 2229/42; B01J 37/0009; B01J 37/0036; B01J 37/18
See application file for complete search history.

(56) References Cited

U.S. PATENT DOCUMENTS

2008/0293989 A1  11/2008  Khanmamedova et al.
2009/0114568 A1   5/2009  Trevino et al.

OTHER PUBLICATIONS

Aksoylu, A.E. et al. (2000) Applied Catalysis A, 192, 29-42.*
Burch, R. (1981) Journal of Catalysis, 71, 348-359.*
Cortright, R.D. et al. (2000) Catalysis Today, 55, 213-223.*
Notification of Transmittal of the International Search Report and the Written Opinion of the International Searching Authority, or the Declaration, including an International Search Report and Written Opinion of the International Searching Authority, mailed Mar. 17, 2014 in connection with PCT International Application No. PCT/IN2013/000691, filed Nov. 11, 2013.
Notification of Transmittal of the International Preliminary Report on Patentability, including an International Preliminary Report on Patentability, mailed Feb. 4, 2014 by the European Patent Office in connection with PCT International Application No. PCT/IN2013/000691, filed Nov. 11, 2013.

* cited by examiner

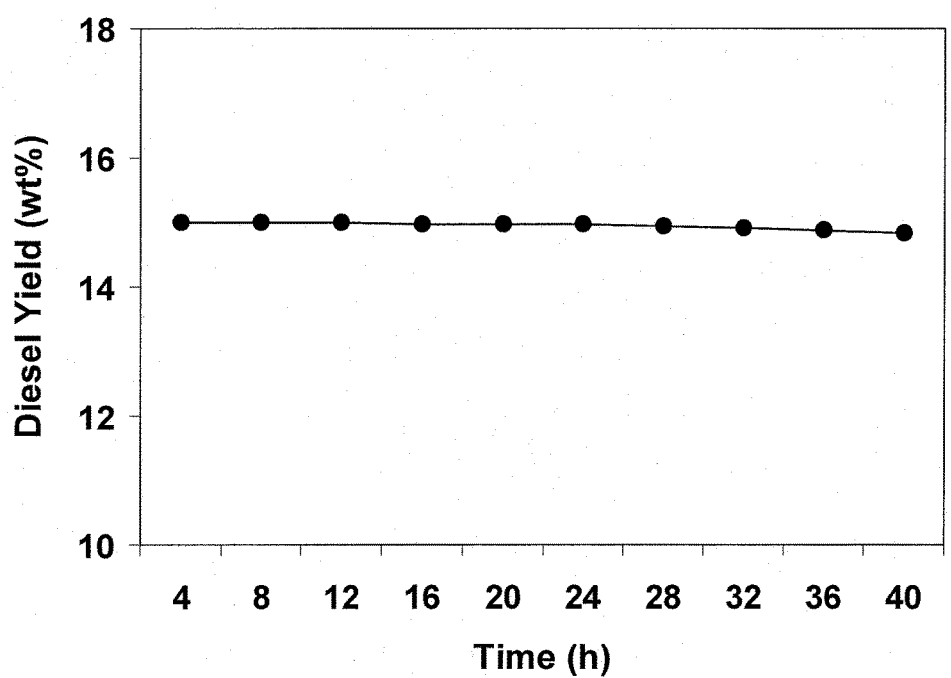
Reaction time vs diesel yield over the catalyst NTDZSM-5

SINGLE STEP CATALYTIC PROCESS FOR THE CONVERSION OF N-PARAFFINS AND NAPHTHA TO DIESEL RANGE HYDROCARBONS

CROSS-REFERENCE TO RELATED APPLICATIONS

This application is a §371 national stage of PCT International Application No. PCT/IN2013/000691, filed Nov. 11, 2013, claiming priority of Indian Patent Application No. 3485/DEL/2012, filed Nov. 9, 2012, the contents of each of which are hereby incorporated by reference in their entirety.

FIELD OF INVENTION

The present invention relates to a single step catalytic process for the conversion of n-paraffins and naphtha to diesel range hydrocarbons. Particularly the invention relates to a process for the preparation of a solid acid catalyst suitable for the effective conversion of n-paraffins and light naphtha in a single reaction (once-through) operation into diesel range hydrocarbons along with gasoline range hydrocarbons, Liquefied Petroleum Gas (LPG) and light olefins ($C_2$-$C_4$) as valuable bi-products. Further, a considerable amount of hydrogen is also produced during the process from the dehydrogenation reaction of paraffins and naphthenes. More particularly, the present invention relates to the preparation of a solid acid catalyst suitable for the effective conversion of light naphtha.

BACKGROUND OF THE INVENTION

The availability of naphtha at refineries has been encouraging its value addition through its effective conversion to various hydrocarbon products. Traditionally gasoline is produced from such feedstocks, where the hydrocarbons such as aromatics, alkyl aromatics and isoparaffins are produced without changing the carbon number of the reactant molecule. Traditionally, lower olefins such as hexene and heptane are converted to diesel through simple oligomerization. But the conversion of n-paraffins was reported to need four-reactor system with at least three catalysts work in sequential reactions of paraffin dehydrogenation, oligomerization and saturation for the production of diesel. Currently the increasing demand for diesel compared to gasoline inspiring refineries to look for new processes that can convert light naphtha directly into diesel range hydrocarbons, which requires a catalyst that can not only facilitate the reforming of the molecule but also increase the carbon number so as to convert low boiling range naphtha into high boiling range diesel. Chemically, the catalyst needs to have active component to facilitate oligomerization reaction to join smaller hydrocarbon molecules to grow up to the range of diesel. The oligomerization reaction is easily occur when the reactant molecules have at least some olefins and most of the recent research is focused on converting olefins such as hexene, heptanes and octenes into diesel range products. For the conversion of paraffin-rich naphtha into diesel range products, there needs additional reaction steps such as paraffin dehydrogenation and it is challenging for a chemist to establish high temperature favored dehydrogenation and low temperature favored oligomerization reactions on a single catalyst system.

Thus the present study explores the possibility developing a zeolite based solid acid catalyst for facilitating the effective conversion of n-heptane into diesel range hydrocarbons. Further, the catalyst explored for the conversion of industrial naphtha cut into diesel range products. The process also produced considerable amount of gasoline, light olefins, LPG and hydrogen as valuable bi-products on the designed catalyst.

References may be made to US 2011/0114538A1 describes a process for the production of kerosene and diesel along with hydrogen from a saturated light cut by using sequential reactors containing molecular sieves and three different catalysts for separation of n-paraffins from isoparaffins followed by dehydrogenation of n-paraffins, oligomerization of olefins and saturation of oligomers in the final reactor to obtain the diesel range product. It involves three catalysts and four reactor system for step wise conversion of naphtha.

Reference may be made to WO 2011/075523A2 describes a catalytic process for production of diesel and other distillates by oligomerization of olefins followed by alkylation of oligomers with the aromatics such as benzene. It was meant for olefin conversion and not suitable for hydrocarbon of paraffins and naphtha range to diesel product.

Reference may be made to U.S. Pat. No. 7,741,526 B2 describes a catalytic process for the production of diesel and jet fuels from a mixture of olefinic streams such as butene, pentene, hexene, butadiene and pentadienes. It was meant for olefin conversion and not suitable for hydrocarbon of paraffins and naphtha range to diesel product.

Reference may be made to U.S. Pat. No. 6,914,165B2 describes the process for the production of diesel cut fuel by sequential reaction steps of oligomerization of $C_2$-$C_{10}$ olefins followed by selective hydrogenation of $C_{12}$-$C_{24}$ oligomers stream. It was meant for olefin conversion and not suitable for hydrocarbon of paraffins and naphtha range to diesel product.

Reference may be made to EP 1249486 B1 describes the process for the production of diesel cut fuel from the sequential reaction steps of oligomerization of $C_2$-$C_4$ olefins, separation of $C_{12}$-$C_{24}$ distillate followed by its saturation to produce the final product. It was meant for olefin conversion and not suitable for hydrocarbon of paraffins and naphtha range to diesel product.

Reference may be made to U.S. Pat. No. 6,281,401 B1 describes oligomerization between smaller olefin (less than $C_5$) and higher olefin (larger than $C_5$) to obtain $C_{11}^+$ oligomers falling in the diesel range hydrocarbons. Alkylation of smaller olefins with longer olefins is used for diesel production. It was meant for olefin conversion. It is not suitable for hydrocarbon of paraffins and naphtha range to diesel product Reference may be made to U.S. Pat. No. 4,740,648 describes a catalytic process for the conversion of $C_2$ to $C_{12}$ linear and branched olefins to liquid motor fuel falling in jet and diesel range. It was meant for olefin conversion and not suitable for hydrocarbon of paraffins and naphtha range to diesel product.

Reference may be made to U.S. Pat. No. 721,304 B2 describes a catalytic process for the production of diesel fuels by oligomerization of short and branched olefins having the chain length from three to eight carbon atoms. The process is not aimed to obtain the diesel range hydrocarbons from paraffins and naphtha range hydrocarbons.

Reference may be made to WO/2006/09/091986 describes catalytic conversion of $C_3$-$C_5$ olefins to diesel and gasoline range fuels. The process is not aimed to obtain the diesel range hydrocarbons from paraffins and naphtha range hydrocarbons.

Reference may be made to US 2006/0217580 describes a catalytic process for the conversion of $C_3$-$C_8$ olefins through oligomerization to produce hydrocarbon composition suitable for jet fuel and diesel applications. The process is not aimed to obtain the diesel range hydrocarbons from paraffins and naphtha range hydrocarbons.

Reference may be made to U.S. Pat. No. 5,780,703 describes a catalytic process for the production of low aromatic diesel fuel with high cetane index from the feedstock containing the mixture of one olefinic component such as propylene and butenes and one iso-paraffinic component such as isobutene or iso-pentane. Process is for the reaction between isoparaffins and olefins. Not suitable for hydrocarbon of paraffins and naphtha range to diesel product Reference may be made to US 2012/0209046A1 described a catalytic process for the production of diesel turbine range hydrocarbons by sequential steps of alcohol dehydration followed by oligomerization of the resultant olefins and hydro-finishing. Process uses alcohol as source for olefin production followed by oligomerization. Not suitable for hydrocarbon of paraffins and naphtha range to diesel product Till date no information is available on single step conversion of n-paraffins such as n-heptane and paraffin containing feedstocks such as naphtha into diesel range products. Most of the references are dealt with the conversion of olefins and mixed olefin feedstocks, or combination of olefins and isoparaffins into diesel range hydrocarbons. Since, n-paraffins and n-paraffin containing feedstocks such as naphtha are cheaply available for value addition, conversion of these feedstocks directly into diesel gains importance in terms of reduced cost of the process and consumption of olefins. The refineries having only paraffins but not olefins, can also process the feedstock through the direct conversion of n-paraffins to diesel. Hence, the present invention relates to provide a single step catalytic process for the conversion of n-paraffins and naphtha to diesel range hydrocarbons. Which obviates the drawbacks of the hitherto known prior art as detailed above for the direct conversion of n-paraffins and naphtha into diesel.

Conversion of paraffins into diesel in a single step process is first of its kind and the process also produces valuable bi-products such as gasoline range hydrocarbons, LPG, light olefins and hydrogen. The catalyst exhibits high yield diesel range hydrocarbons of about 15 wt %, highest gasoline yield of about 74 wt % with iso-paraffins and aromatics as major components. Moreover, considerable amount of the Liquefied Petroleum Gas (LPG) (18 wt %) and light olefins (10.7 wt %) are also formed as bi-product that adds value to the process. The study reveals the effective conversion of naphtha to high octane gasoline. The catalyst also exhibits the stability in activity for the studied period of 40 h.

The problems solved by the present invention are as follows:
1. Development of a catalyst bearing active site components suitable for facilitating the various hydrocarbon conversion steps such as dehydrogenation of n-paraffins, oligomerization of olefins and saturation of oligomers for the direct production of higher range hydrocarbons from the short chain n-paraffins or mixed feedstocks like naphtha.
2. Single reactor and single catalyst system for simplicity in process operation and to reduce process cost
3. Unlike other similar processes, there is no requirement of olefins in the feedstock. The paraffin rich (olefin-free) hydrocarbons can be directly used as feedstocks so as to check the performance of the catalyst for the value addition of n-paraffins or naphtha into diesel range hydrocarbons.

OBJECT OF THE INVENTION

The main object of the present invention is to provide a single step catalytic process for the conversion of n-paraffins and naphtha to diesel range hydrocarbons.

Another object of the present invention is to provide a single step process for the conversion of n-paraffins such as n-heptane and naphtha (90-14.0° C.) into diesel range hydrocarbons.

Yet another object of the present invention is to provide process suitable for the production of valuable bi-products gasoline blending stock along with negligible concentration of benzene.

Yet another object of the present invention is to provide process suitable for production of light olefins as valuable bi-product.

Yet another object of the present invention is to provide a process suitable for production of Liquefied Petroleum Gas (LPG) range hydrocarbons as co-bi product along with hydrogen.

Still another object of the present invention is to provide a process for the preparation of Pt—Sn-ZSM-5 catalyst.

SUMMARY OF THE. INVENTION

Accordingly, the present invention provides a single step catalytic process for the conversion of n-paraffins and naphtha (90-1400 C) to diesel range hydrocarbons using Pt—Sn-ZSM-5 catalyst, wherein the said process comprises loading of Pt—Sn-ZSM-5 catalyst in a reactor followed by reducing the catalyst using the hydrogen at 500-6000 C for 6-10 h with 6-16 l/h hydrogen gas flow further, introducing the feed in a continuous flow rate 2-10 h-1 WHSV (weight hourly space velocity) at temperatures ranging between 400° C.-450° C. with a carrier gas, preferably, nitrogen gas at flow rate 5-50 l/h at pressure ranging between 2-30 bar to obtain liquid products containing gasoline and diesel collected from downstream and gas product collected from upstream. A considerable amount of hydrogen is also produced during the process from the dehydrogenation reaction of paraffins and naphthenes.

In the present invention the percentage of Pt and Sn in Pt—Sn-ZSM-5 catalyst is in the range of 0.1- to 1.0 wt % and 0.2 wt % to-1.6-wt % respectively and the catalyst bed was sandwiched between two layers of alpha alumina (inert binder material) for the mechanical support. In the present invention the Si/Al ratio in ZSM-5 is in the range of 15 to 200 and the yield of diesel is in the range of 2 to 15 wt % and gasoline is in the range of 50 wt % to 80 wt %. The valuable bi-products are LPG, olefins and hydrogen and the catalyst exhibits stability in activity in terms of diesel yield for the minimum reaction time period of 40 h.

BRIEF DESCRIPTION OF THE GRAPH AND TABLES

FIG. 1 represents a plot of the reaction time vs diesel yield over the promising catalyst (NTDZSM-5) described in example 9.

Table 1 is indicating the detailed components and D-86 analysis of naphtha (90-140° C.) feed described in example 3.

Table 2 is indicating the overall performance of PT-SN-ZSM-5 catalyst for conversion of naphtha to diesel described in example 3.

Table 3 is indicating the overall olefins distribution on various reaction temperatures described in example 6.

DETAILED DESCRIPTION OF THE INVENTION

While the invention is susceptible to various modifications and alternative forms, specific aspect thereof has been shown by way of examples and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The Applicants would like to mention that the examples are mentioned to show only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, catalyst composition, complex composition that comprises a list of components does not include only those components but may include other components not expressly listed or inherent to such process, catalyst composition, complex composition. In other words, one or more elements in a system or process proceeded by "comprises . . . a" does not, without more constraints, preclude the existence of other elements or additional elements in the system or process.

In the following detailed description of the aspects of the invention, reference is made to the accompanying graphs that form part hereof and in which are shown by way of illustration specific aspects in which the invention may be practiced. The aspects are described in sufficient details to enable those skilled in the art to practice the invention, and it is to be understood that other aspects may be utilized and that charges may be made without departing from the scope of the present invention. The following description is, therefore, not to be taken in a limiting sense, and the scope of the present invention is defined only by the appended claims.

In accordance with the above aspects, the invention will now be described in detail in connection with certain preferred and optional embodiments, so that various aspects thereof may be more fully understood and appreciated.

The present invention describes a novel catalytic process for the direct conversion of n-paraffins such as n-heptane and olefin free mixed feedstocks such as naphtha (90-140° C.) in a single step to produce the diesel range hydrocarbons. Traditionally, lower olefins such as hexene and heptene are converted to diesel through simple oligomerization. But the conversion of n-paraffins was reported to need four-reactor system with at least three catalysts work in sequential reactions of paraffin dehydrogenation, oligomerization and saturation for the production of diesel. The present invention deals with the development of a single step process works based on a zeolite catalyst which is suitable for the value addition of naphtha (90-140° C.) for the production of diesel range hydrocarbons along with considerable amount of bi-products such as gasoline, Liquefied Petroleum Gas (LPG) and olefins in a single step conversion. The catalyst exhibits conversion of naphtha (90-140° C.) in the range of 10-20 wt %, preferably about 15 wt % yield to diesel and gasoline in the range of 65 to 80 wt %, preferably about 74 wt % yield having Research Octane Number (RON) of about 60 in which the major components are iso-paraffins and aromatics. The low benzene content in the aromatic (gasoline) product makes advantage for its suitability for gasoline applications.

The present invention relates to a single step catalytic process for the conversion of n-paraffins and naphtha (90-140° C.) to diesel range hydrocarbons using Pt—Sn-ZSM-5 catalyst, wherein the said process comprises loading of Pt—Sn-ZSM-5 catalyst in a reactor followed by reducing the catalyst using the hydrogen at 500-600° C. for 6-10 h with 6-16 l/h hydrogen gas flow further, introducing the feed in a continuous flow rate 2-10 $h^{-1}$ WHSV (weight hourly space velocity) at temperatures ranging between 400° C.-450° C. with a carrier gas, at flow rate 5-50 l/h at pressure ranging between 2-30 bar to obtain diesel range hydrocarbons.

In other embodiment of the present invention the percentage of Pt and Sn in Pt—Sn-ZSM-5 catalyst is in the range of 0.1- to 1.0 wt % and 0.2 wt % to-1.6-wt % respectively.

In other embodiment of the present invention the catalyst bed is sandwiched between two layers of alpha alumina (inert binder material) for the mechanical support.

In other embodiment of the present invention the Si/Al ratio in ZSM-5 is in the range of 15 to 200.

In yet another embodiment of the present invention, yield of diesel is in the range of 2 to 15 wt %.

In yet another embodiment of the present invention, gasoline is in the range of 50 wt % to 80 wt %.

In yet another embodiment of the present invention, valuable bi-products LPG, olefins and hydrogen are also obtained.

In yet another embodiment of the present invention, the catalyst exhibits stability in activity in terms of diesel yield for the minimum reaction time period of 40 h.

In yet another embodiment of the present invention, the carrier gas is nitrogen gas.

To balancing the reaction condition and proceeding both dehydrogenation followed by oligomerization on the single catalyst and in the same reactor to produce the diesel range hydrocarbons ($C_{10}$-$C_{21}$).

The novelty of the invention lies in development of a single step catalytic process for the conversion of naphtha to diesel range hydrocarbons that has following features:

1. The process is provided a single catalyst composition operating in a single reactor for the direct conversion of n-heptane and heptane containing naphtha feedstocks into diesel range hydrocarbons.
2. This process proceeds from the saturated compounds like n-heptane and naphtha (90-140° C.) even in the absence of any olefins in the feed.
3. The process also produces valuable bi-products such as gasoline, LPG, olefins and hydrogen.

The present invention provides a single step catalytic process for the conversion of naphtha to diesel range hydrocarbons which process comprises the sequential steps of:

a) preparation of support extrudates using H-ZSM-5 with framework silicon-to-aluminum ratio of 100 and an inert alumina binder, preferably pseudo boehmite in the weight ratio of 3:2 zeolite:binder (60 g zeolite for 40 g binder) with continuous grinding;

b) adding 20 ml of 3 vol % glacial acetic acid (3 ml glacial acetic acid in 100 ml of distilled water) to the resultant zeolite-binder solid mixture and allowing it for peptization for 6 h for 50 gm ZSM5 extrudates;

c) wet extrusion of the resultant paste through a 2 mm diameter size metallic syringe for the formation of wet extrudates, followed by their drying at 25° C. temperature for 12 h and drying at 120° C. for 6 h followed by calcination at 500° C. for 4 h;

d) impregnation of 1.2 wt % tin on the extrudates, where 0.4179 g of tin chloride salt is dissolved in 12 ml of distilled water and the resultant solution was drop-wise added to the zeolite extrudates (20 g) for uniform wet impregnation of the tin salt, followed by drying the extrudates at 25° C. temperature for 12 h and drying at 120° C. for 6 h to obtain Sn-ZSM-5 extrudates;

e) impregnation of 0.6 wt % of the second metal Platinum on the Sn-ZSM-5 extrudates obtained in step d) by dissolving 0.25 g of Hexa cloroplatinic acid salt in 12 ml of distilled water and the resultant solution was drop wise added to the Sn-ZSM-5 extrudates for uniform wet impregnation of platinum salt, followed by drying the extrudates at 25° C. temperature for 12 h and drying at 120° C. for 6 h followed by calcination at 500° C. for 4 h to obtain Pt—Sn-ZSM-5 extrudates denoted as NTDZSM-5;

f) providing the catalyst extrudates with 1-1.5 mm diameter and 2-3 mm length;

g) providing feedstocks such as n-heptane or naphtha (90-140° C.) as a source of n-paraffins;

h) providing feedstock flow rate in 2-10 h" WHSV (weight hourly space velocity); (Please provide some workable range here)

i) providing reaction temperatures of 400-450° C.;

j) providing nitrogen gas as feed career and as pressurizing gas in the flow rate of 5-50 lit/h providing reaction pressure of 2-30 bar);

k) cooling the product gas to obtain liquid and gas products and analyzed by gas chromatograph.

In the present invention, there is provided a single catalyst composition operating in a single reactor for the direct conversion of n-heptane and heptane containing naphtha feedstocks into diesel range hydrocarbons. In the present invention, there is provided a single catalyst system for catalytic conversion of naphtha into diesel range hydrocarbons which reduce the process cost and to avoid complicated operation of multi reactor systems. A process also produces valuable bi-products such as gasoline, LPG, light olefins and hydrogen. There is a catalytic process that provides product choice to vary the yields of various products by optimizing the process conditions, without changing the catalyst. For example the diesel yield varies from 2.3 wt % to 15 wt % and gasoline yield is varied from 24.7 wt % to 73.8 wt %. There is a catalytic process provides valuable bi-product gasoline contains very low concentration of benzene, high concentration of xylenes, toluene and branched paraffin that makes its suitability for fuel applications.

EXAMPLES

The following examples are given by way of illustration of the present invention and therefore should not be construed to limit the scope of the present invention.

Example-1

This example illustrates the preparation Pt—Sn-ZSM-5, the catalyst is done by mixing an inert alumina binder (pseudo boehmite) with zeolite:binder ratio of 3:2 (30 g zeolite for 20 g binder) with continuous grinding after that adding of 25 ml of 3 vol % glacial acetic acid (0.25 ml glacial acetic acid in 24.75 ml of distilled water) to the resultant zeolite-binder solid mixture and allowing it for peptization for 6 h. Wet extrusion of the resultant paste is carried out through a 2 mm diameter size metallic syringe for the formation of wet threads, followed by their drying at 25° C. temperature for 12 h and drying at 120° C. for 6 h followed by calcination at 500° C. for 4 h. By the post metal impregnation method, impregnation of 1.2 wt % tin on the extrudates, where 0.4179 g of tin chloride salt is dissolved in 12 ml of distilled water and the resultant solution is drop-wise added to the 20 g zeolite extrudates for uniform wet impregnation of the tin salt, followed by drying the extrudates at 25° C. temperature for 12 h and drying at 120° C. for 6 h to obtain Sn-ZSM-5 extrudates. After that second metal Pt is impregnate on Sn-ZSM-5 extrudates, for 0.6 wt % Pt dissolved 0.25 g of Hexa cloroplatinic acid salt in 12 ml of distilled water and the resultant solution is drop wise added to the Sn-ZSM-5 extrudates for uniform wet impregnation of platinum salt, followed by drying the extrudates at 25° C. temperature for 12 h and drying at 120° C. for 6 h followed by calcination at 500° C. for 4 h to obtain Pt—Sn-ZSM-5 extrudates.

Example-2

This example illustrates the catalytic performance towards the effective conversion of n-paraffins and naphtha to diesel range hydrocarbons on PT-SN-ZSM-5 catalysts. In a typical procedure, 13 g of the PT-SN-ZSM-5 catalyst is loaded in a tubular fixed bed reactor of volume 700 ml and the catalyst bed is sandwiched between two layers of alpha alumina (inert binder material) for the mechanical support. Reduce the catalyst by using the hydrogen at 520° C. for 8 h with 12 l/h gas flow. The feed (composition given in table 1) is introduced in a continuous flow using plunger type feed pump. The reaction is conducted at various reaction temperatures such as 400° C. and 450° C. with nitrogen gas using as carrier gas (30 l/h) at 15 bar reaction pressure while keeping the constant feed rate of 3 $h^{-1}$ WHSV. The product obtained at the end of the reactor is cooled with the help of a cold water circulator, where the entire product is separated into two products, namely, liquid product (collected from down stream) and gas product (collected through a gas bulb by water displacement method).

The gas product is analyzed using Varian capillary column, CP $Al_2O_3$/KCl (50 m×0.53 mm×10 μm) that gives the analysis of $C_1$-$C_5$ hydrocarbons present in the product. The liquid product is analyzed using Petrocal DH, 100% dimethyl polysiloxane as stationary phase (100 m×0.25 mm×0.5 μm). Standard Test Method is used for detailed hydrocarbon group analysis, distribution of products and RON measure, where DHA (detailed hydrocarbon analysis) is obtained by using standard software Hydrocarbon Expert 4 (USA).

Example-3

This example illustrates the detailed feed composition of naphtha (90-140° C.) and the product distribution conducted at various reaction temperatures such as 400° C. and 450° C. with nitrogen gas using as carrier gas 30 l/h) at 15 bar reaction pressures while keeping the constant feed rate of 3 $h^-$ WHSV. Naphtha is a light fraction of petroleum and is composed mainly of naturally occurring hydrocarbons which are grouped into paraffins (P), naphthenes (N), and aromatics (A); the analysis of naphtha (90-140° C.) is vitally important for the process control, operation and product quality. Detail analysis of the feed has been conducted for its properties. The carbon number wise analysis of the components with hydrocarbon grouping is given in Table 1.

TABLE 1

Detailed components and ASTM D-86 analysis of naphtha feed

| Carbon No. (wt %) | n-Paraffins | i-Paraffins | Naphthenes | Aromatics |
|---|---|---|---|---|
| $C_5$ | 0.0 | 0.0 | 0.1 | — |
| $C_6$ | 3.5 | 1.6 | 2.3 | 0.3 |
| $C_7$ | 16.1 | 8.5 | 7.2 | 3.6 |
| $C_8$ | 13.2 | 12.8 | 8.7 | 6.0 |
| $C_9+$ | 2.9 | 10.1 | 1.2 | 0.8 |
| Total | 35.7 | 33.0 | 19.5 | 10.7 |

D-86 analysis

| IBP (° C.) | 5% | 10% | 20% | 30% | 40% | 50% | 60% | 70% | 80% | 90% | 95% | FBP (° C.) |
|---|---|---|---|---|---|---|---|---|---|---|---|---|
| 66.0 | 99.1 | 101.9 | 103.4 | 107.0 | 109.6 | 112.5 | 115.9 | 119.7 | 124.5 | 131.2 | 136.6 | 153.9 |

Grand Total: 98.9, Unidentified: 1.1 and RON: 43.8

The overall product distribution in single step catalytic process for the conversion of naphtha to diesel range hydrocarbons with using heptane and naphtha (90-140° C.) as feed is given in Table-2

TABLE 2

Performance of PT-SN-ZSM-S catalyst for conversion of naphtha to diesel

| Feed | n-Heptane | n-Heptane | Naphtha (90-140° C.) | Naphtha (90-140° C.) |
|---|---|---|---|---|
| Reaction Conditions | | | | |
| Temperature (° C.) | 400 | 450 | 400 | 450 |
| Pressure (bar) | 15 | 20 | 15 | 15 |
| WHSV($h^{-1}$) | 3 | 3 | 3 | 3 |
| Product Composition | | | | |
| A. Gas yield (wt %) | 64.5 | 72.6 | 26.0 | 23.9 |
| Hydrogen | 2.4 | 2.6 | 1.7 | 1.7 |
| $C_1 + C_2$ | 10.6 | 11.0 | 1.7 | 1.8 |
| $C_2^= + C_3^= + C_4^=$ | 4.0 | 9.0 | 3.8 | 5.7 |
| LPG | 47.5 | 50.0 | 18.8 | 14.7 |
| $C_3$ | 43.5 | 41.0 | 14.7 | 12.3 |
| $C_4$ | 4.0 | 9.0 | 4.1 | 2.4 |
| B. Liquid yield (wt %) | 35.5 | 27.4 | 74.0 | 76.1 |
| Gasoline | 27.5 | 24.7 | 59.0 | 73.8 |
| Paraffins | 1.8 | 2.2 | 10.8 | 14.3 |
| i-paraffins | 0.9 | 3.6 | 22.9 | 27.6 |
| Aromatic | 23.8 | 16.3 | 11.7 | 15.5 |
| Naphthenes | 0.3 | 0.6 | 8.6 | 11.3 |
| Olefins | 0.7 | 2.0 | 5.0 | 5.1 |
| Diesel | 8.0 | 2.7 | 15.0 | 2.3 |
| Paraffin's | 0.1 | 0.0 | 1.0 | 0.1 |
| i-paraffins | 1.1 | 0.5 | 1.3 | 0.7 |
| Aromatic | 2.4 | 1.1 | 5.6 | 1.1 |
| Naphthenes | 0.3 | 0.1 | 0.0 | 0.2 |
| Olefins | 1.3 | 0.4 | 2.1 | 0.1 |
| $C_{12+}$ hydrocarbons | 2.8 | 0.6 | 5.0 | 0.1 |
| Total (A + B) | 100 | 100 | 100 | 100 |

Example-4

This example illustrates the yield and composition of diesel obtained from n-heptane as well as naphtha feedstocks in the single step conversion using PT-SN-ZSM-5 catalyst at two reaction temperatures (400° C. and 450° C.) while keeping constant pressure (15 bar) and WHSV (3 $h^{-1}$) conditions.

In n-heptane conversion (Table 2) at lower reaction temperature (400° C.) diesel yield is 8.0 wt % containing 2.4 wt % of aromatics followed by 1.3 wt % olefins as main components. At higher reaction temperature (450° C.) the formation of diesel yield is decreased to 2.7 wt % with simultaneous decrease in diesel range aromatics and olefins to 1.1 wt % and 0.4 wt % respectively.

Similarly in naphtha conversion (Table 2) at lower reaction temperature (400° C.) diesel yield is 15.0 wt % containing 5.6 wt % of aromatics followed by 2.1 wt % olefins as main components. At higher reaction temperature (450° C.) the formation of diesel yield is decreased to 2.3 wt % with simultaneous decrease in diesel range aromatics and olefins to 1.1 wt % and 0.1 wt % respectively.

Example-5

This example illustrates the yield and composition of gasoline obtained from n-heptane as well as naphtha feedstocks in the single step conversion using PT-SN-ZSM-5 catalyst at two reaction temperatures (400° C. and 450° C.) while keeping constant pressure (15 bar) and WHSV (3 $h^{-1}$) conditions.

In n-heptane conversion (Table 2) at lower reaction temperature. (400° C.) gasoline yield is 27.5 wt % containing 0.9 wt % of iso-paraffins followed by 23.8 wt % aromatics as main components. At higher reaction temperature (450° C.) the formation of gasoline yield is slightly decreased to 24.7 wt % with increase in gasoline range isoparaffins 3.6 wt % but aromatics yield is decreased to 16.3 wt %.

Similarly in naphtha conversion (Table 2) at lower reaction temperature (400° C.) gasoline yield is 59.0 wt % containing 22.9 wt % of iso-paraffins followed by 11.7 wt % aromatics as main components. At higher reaction temperature (450° C.) the formation of gasoline yield is increased to 73.8 wt % with simultaneous increase in gasoline range iso-paraffins and aromatics to 27.6 wt % and 15.5 wt % respectively.

Example-6

This example illustrates the yield and composition of olefins obtained from n-heptane as well as naphtha feedstocks in the single step conversion using PT-SN-ZSM-5 catalyst at two reaction temperatures (400° C. and 450° C.) while keeping constant pressure (15 bar) and WHSV (3 $h^{-1}$) conditions.

In n-heptane conversion (Table 3) at lower reaction temperature (400° C.) olefins yield is 6.0 wt % containing 4.0 wt % $C_2$ to $C_4$ olefins followed by 0.7 wt % $C_5$ to $C_9$ olefins and 1.3 wt % of $C_{9+}$ olefins. At higher reaction temperature (450° C.) the formation of olefins yield is increased to 11.4 wt % with simultaneous increase in $C_2$ to $C_4$ olefins to 9.0 wt % followed by $C_5$ to $C_9$ olefins to 2.0 wt % s but $C_{9+}$ olefins decreased to 0.4 wt %.

Similarly in naphtha conversion (Table 3) at lower reaction temperature (400° C.) olefins yield is 10.9 wt % containing 3.8 wt % $C_2$ to $C_4$ olefins followed by $C_5$ to $C_9$ olefins to 5.0 wt % and 2.1 wt % of $C_{9+}$ olefins. At higher reaction temperature (450° C.) the formation of olefins yield is also 10.9 wt % with simultaneous increase in $C_2$ to $C_4$ olefins to 5.7 wt % followed by $C_5$ to $C_9$ olefins to 5.1 wt % but $C_{9+}$ olefins decreased to 0.1 wt %.

TABLE 3

Distribution of olefins on conversion of naphtha to diesel

| Feed | n-Heptane | n-Heptane | Naphtha (90-140° C.) | Naphtha (90-140° C.) |
|---|---|---|---|---|
| Reaction Conditions | | | | |
| Temperature (° C.) | 400 | 450 | 400 | 450 |
| Pressure (bar) | 15 | 15 | 15 | 15 |
| WHSV ($h^{-1}$) | 3 | 3 | 3 | 3 |
| Olefins Yield (wt %) | 6.0 | 11.4 | 10.9 | 10.9 |
| $C_2$-$C_4$ | 4.0 | 9.0 | 3.8 | 5.7 |
| $C_5$-$C_9$ | 0.7 | 2.0 | 5.0 | 5.1 |
| $C_{9+}$ | 1.3 | 0.4 | 2.1 | 0.1 |

This example illustrates the yield and composition of liquified petroleum Gas (LPG) blending compounds obtained from n-heptane as well as naphtha feedstocks in the single step conversion using PT-SN-ZSM-5 catalyst at two reaction temperatures (400° C. and 450° C.) while keeping constant pressure (15 bar) and WHSV (3 $h^{-1}$) conditions.

In n-heptane conversion (Table 2) at lower reaction temperature (400° C.) LPG yield is 47.5 wt % containing 43.5 wt % of propane followed by 4.0 wt % of butanes are as main components. At higher reaction temperature (450° C.) the formation of LPG yield is 50.0 wt % containing 41.0 wt % of propane followed by 9.0 wt % butanes.

Similarly in naphtha conversion (Table 2) at lower reaction temperature (400° C.) LPG yield is 18.8 wt % containing 14.7 wt % of propane followed by 4.1 wt % butanes are as main components. At higher reaction temperature (450° C.) the formation of LPG yield is decreased to 14.7 wt % containing 12.3 wt % propane followed by 2.4 wt % of butanes.

In the LPG blending feedstock the main component is propane and it highly demandable for petrochemical industries.

Example-8

This example illustrates the yield of hydrogen gas obtained from n-heptane as well as naphtha feedstocks in the single step conversion using PT-SN-ZSM-5 catalyst at two reaction temperatures (400° C. and 450° C.) while keeping constant pressure (15 bar) and WHSV (3 $h^{-1}$) conditions.

In n-heptane conversion (Table 2) at lower reaction temperature (400° C.) hydrogen gas yield is 2.4 wt % while at higher reaction temperature (450° C.) the formation of hydrogen gas yield is almost constant, it is 2.6 wt %.

Similarly in naphtha conversion (Table 2) at lower reaction temperature (400° C.) hydrogen gas yield is 1.7 wt %. At higher reaction temperature (450° C.) the formation of hydrogen gas yield (1.7 wt %) is constant.

Example-9

This example illustrates the stability in activity of PT-SN-ZSM-5 catalyst in terms of diesel yield in the single step conversion of naphtha (90-140° C.) at 400° C. reaction temperature, 15 bar pressure and 3 $h^{-1}$ WHSV reaction conditions.

Graph 1 clearly indicates that throughout the reaction time the catalyst exhibited the diesel yields of about 15 wt % in the studied period of 40 h.

The main advantages of the present invention are:
1. The present invention provides a single catalyst system operating in a single reactor for the direct conversion of n-paraffins such as n-heptane and n-paraffins containing feedstocks such as naphtha into to diesel range products to reduce the process cost and to avoid complicated operation of multi-reactor systems.
2. The process also produces valuable bi-products such as gasoline, LPG, light olefins and hydrogen.
3. The catalytic process of the present invention provides product choice to vary the yields of various products by optimizing the process conditions, without changing the catalyst. For example the diesel yield varies from 2.3 wt % to 15.0 wt % and gasoline yield is varied from 24.7 wt % to 73.8 wt %.
4. The process produces $C_{10}$-$C_{21}$ diesel range hydrocarbons mostly containing mono aromatic compounds that are less carcinogenic and have good cetane number for diesel applications.
5. Gasoline contains very low concentration of benzene, high concentration of xylenes, toluene and branched paraffin that makes its suitability for fuel applications.

The invention claimed is:
1. A single step catalytic process for the conversion of n-paraffins and naphtha (90-140° C.) to diesel range hydrocarbons using Pt—Sn-ZSM-5 catalyst, wherein the said process comprises loading of Pt—Sn-ZSM-5 catalyst in a reactor followed by reducing the catalyst using hydrogen at 500-600° C. for 6-10 h with 6-16 l/h hydrogen gas flow further, introducing the feed in a continuous flow rate 2-10 $h^{-1}$ WHSV (weight hourly space velocity) at temperatures ranging between 400° C.-450° C. with a carrier gas, at flow rate 5-50 l/h at pressure ranging between 2-30 bar to obtain liquid products and gas products, wherein liquid products are diesel range hydrocarbons and gasoline.
2. The process as claimed in claim 1, wherein percentage of Pt and Sn in Pt—Sn-ZSM-5 catalyst is in the range of 0.1- to 1.0 wt % and 0.2 wt % to-1.6-wt % respectively.
3. The process as claimed in claim 1, wherein catalyst bed is sandwiched between two layers of alpha alumina (inert binder material) for the mechanical support.
4. The process as claimed in claim 1, wherein yield of diesel is in the range of 2 to 15 wt %.
5. The process as claimed in claim 1, wherein yield of gasoline is in the range of 50 wt % to 80 wt %.
6. The process as claimed in claim 1, wherein valuable bi-products LPG, olefins and hydrogen are also obtained.
7. The process as claimed in claim 1, wherein the catalyst exhibits stable activity in terms of diesel yield for a minimum reaction time period of 40 h.

8. The process as claimed in claim 1, wherein the carrier gas is nitrogen gas.

* * * * *